United States Patent [19]

Jacobs

[11] 4,311,465
[45] Jan. 19, 1982

[54] LANGUAGE TRANSLATOR

[76] Inventor: Jose C. Jacobs, 582-B Sycamore, Laredo, Tex. 78041

[21] Appl. No.: 127,862

[22] Filed: Mar. 6, 1980

[51] Int. Cl.³ ............................................. G09B 1/28
[52] U.S. Cl. .................................................. 434/157
[58] Field of Search .............................. 35/2, 35 R, 75; 434/157, 172, 175, 123

[56] References Cited

U.S. PATENT DOCUMENTS 2,385,452 9/1945 Lande ................................ 35/35 R
2,636,496 4/1953 Hollop ............................ 35/35 R X

FOREIGN PATENT DOCUMENTS 126497 5/1919 United Kingdom ............... 434/157

OTHER PUBLICATIONS

"Alphabet Flip Chart" by Kenworthy, p. 153, of Cleo Learning Aids Catalog, Feb. 1976.

*Primary Examiner*—Harland S. Skogquist
*Attorney, Agent, or Firm*—Harvey B. Jacobson

[57] ABSTRACT

A translator comprises a plurality of juxtaposed columns with each column slidably receiving a plurality of individual cards. The columns are organized in a sequential, semantic, and/or syntactic relationship in order that the user may select syntactic components from two or more columns so as to effect larger grammatical constructions such as sentences. In each column, the top cards can be slid upwardly to expose the desired grammatical structure beneath. The back of each preceding card contains the translation of the exposed grammatical structure and can be viewed by flipping the translator over whereupon the translated grammatical structure can be read directly.

8 Claims, 8 Drawing Figures

U.S. Patent  Jan. 19, 1982  Sheet 1 of 3  4,311,465
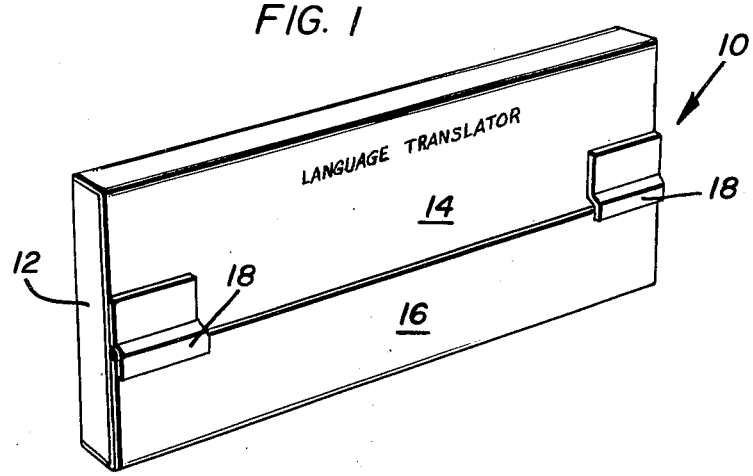
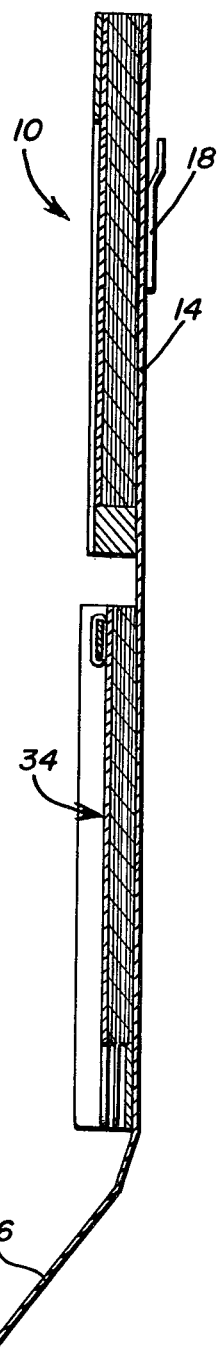

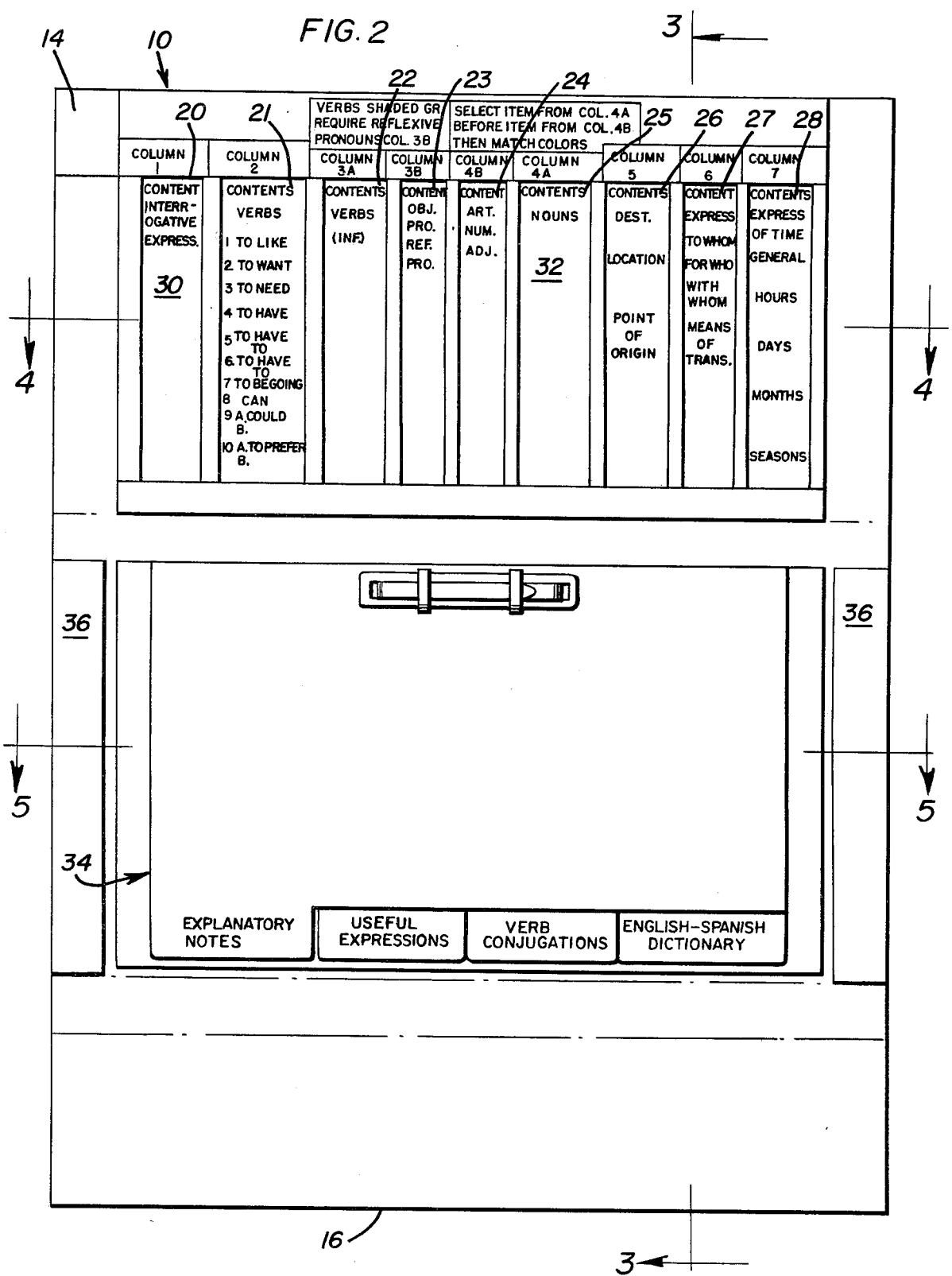

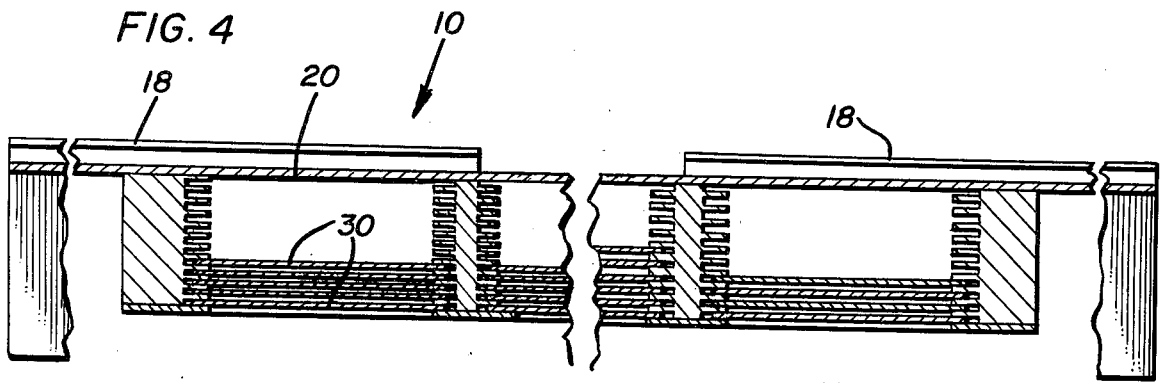
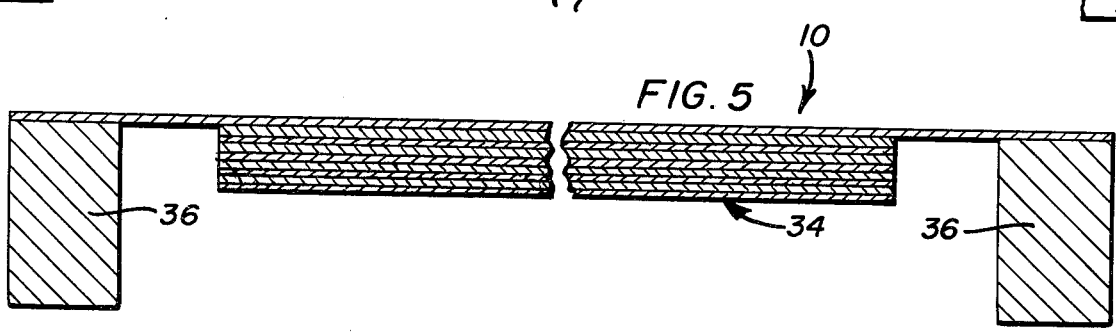
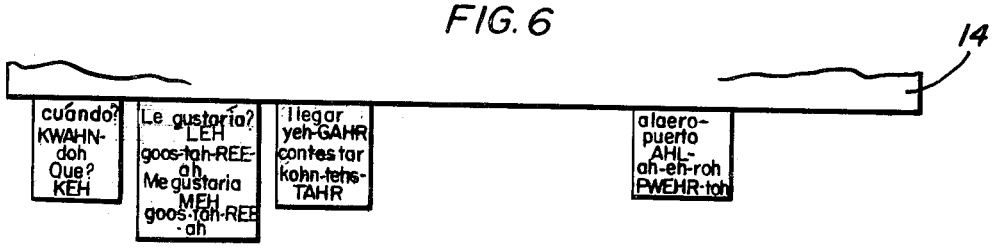
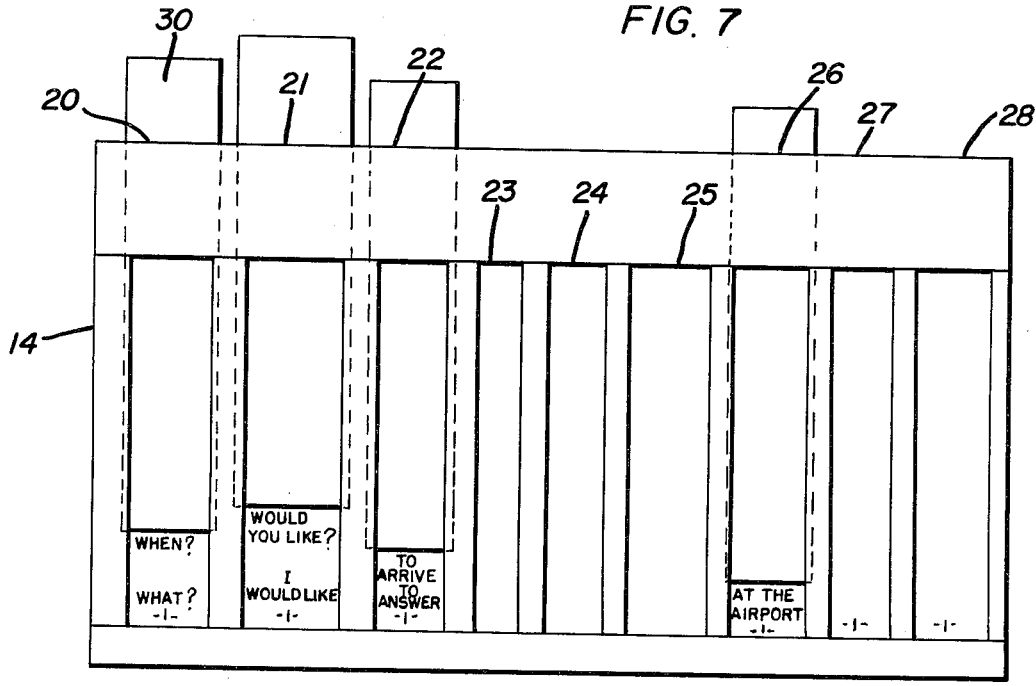

LANGUAGE TRANSLATOR

BACKGROUND OF THE INVENTION

1. Field of the Invention

The present invention relates generally to language translation devices and more particularly pertains to a new and improved portable language translating device which utilizes slidable, stacked cards having language translations on opposed sides thereof.

2. Discussion of Related Art

Quite often, it is desirable to have a means of visual or oral communication between persons with differing native tongues. The use of a standard dictionary can suffice in certain instances to provide a reasonable translation to accomplish this communication. However, in many circumstances it is desirable to have a more readily usable translation device which allows one to easily and quickly translate into a foreign tongue while maintaining proper syntactic and semantic relationships.

One example of a device for translating from one language to another can be seen in U.S. Pat. No. 3,089,258, issued May 14, 1963 to Kavanaugh et al. The Kavanaugh et al device comprises a casing having a series of apertures transversely aligned, a corresponding series of elements bearing columns of words in a language "A" which are movable longitudinally relative to the housing so as to bring the words successively into registration with the aperture respectively corresponding thereto, a further series of columns of words in a language "B" that are translations or equivalents of the words in the columns of language "A" and which are arranged in similar order thereto and are mounted either upon the casing or on the longitudinally movable elements in addition to language "A". U.S. Pat. No. 2,950,544, issued Aug. 30, 1960 to Leighton, shows a bilingual communicator comprising four pages arranged in pairs to form an initiating letter portion. Each letter portion includes a guide sheet and a message sheet. The four sheets are secured together in accurate register by means of staples or the like adjacent the top edge of the assembly. Each page is perforated at the top edge for tear-off purposes. U.S. Pat. No. 1,343,112, issued June 8, 1920 to Charrier, shows a translating chart comprising a disc having a series of indicating indicia on its face with phrases between the indicia, and the disc has a plurality of radially appearing phrases on one side and a series of radially appearing phrases on the opposite side in a different language, with slots being provided on the opposed sides to facilitate the desired reading of the language translation.

SUMMARY OF THE INVENTION

One object of the present invention is to provide a language translator which is easy to use and which can translate from one language into another language with ease and accuracy.

A further object of the present invention is to provide a language translator which is physically simple in form and easy to manipulate so as to provide the desired translation.

Yet another object of the present invention is to provide a language translator which is rugged and durable and which can easily be transported.

In accordance with the above objects, the translator incorporates a stack of rectangular cards of identical dimensions provided in longitudinal frames or dividers to facilitate independent movement of the cards. Each stack consists of a minimum of two cards or a maximum of cards as determined by needs and physical feasibility.

The primary function of the translator is the systematic, spatially-synchronized storage of written, printed and/or pictorial forms for the purpose of dispensation in a convenient-to-use manner. By applying pressure to the topmost card in each stack, that card is slid across the surface of the card directly underlying it. Given the identical dimensions of the cards, the areas exposed on the lower card and upper card are identical, a fact which permits the placement or programming of related, complementary and/or interlingual equivalent forms, i.e., translations in spatially synchronized positions.

Thus, by sliding the upper card across the surface of the lower card, the user may select an item which is known to him on the lower card using the edge of the upper card as the selector or indicator. The desired "unknown" information is provided on the corresponding spot on the surface of the upper card and may be retrieved by the user by flipping the stack of cards towards him, thus transporting the exposed surfaces of cards A and B with relation to the user. In this position, the edge of card B, as well as those of the other cards which remain in their original position, serve as an indicator for the "unknown" form sought by the user.

Since the same relation exists between any two cards in sequential position, the procedure described may be repeated using any two adjacent cards.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the language translator forming the present invention.

FIG. 2 is a top plan view of the language translator shown opened.

FIG. 3 is an elevational sectional view taken substantially along a plane passing through section line 3—3 of FIG. 2.

FIG. 4 is an elevational sectional view taken substantially along a plane passing through section line 4—4 of FIG. 2.

FIG. 5 is an elevational sectional view taken substantially along a plane passing through section line 5—5 of FIG. 2.

FIG. 6 is a plan view of the reverse side of the language translator showing the translated information.

FIG. 7 is a plan view of the front of the language translator demonstrating its use in forming a complete sentence.

FIG. 8 is a view indicating the information disposed on adjacent cards in a stack.

DESCRIPTION OF THE PREFERRED EMBODIMENT

Now with reference to the drawings, a language translator incorporating the principles and concepts of the present invention and generally referred to by the reference numeral 10 will be described in detail. The translator 10 includes a casing 12 having overlapping and interlocking front flaps 14 and 16. Flap 16 can be slid beneath offset locking elements 18 in order to hold the casing 12 closed. Mounted inside of the casing 12 on flap 14 are a plurality of juxtaposed columns 20 through 28. The number and size of the columns 20-28 will vary according to the language being translated as would be obvious to one of ordinary skill in the art. Each column contains a plurality of rectangular cards such as shown at 30 in column 20. Each card 30 is disposed in an individual slide in order to be capable of sliding up and down within column 20. As a card 30 is slid upwardly in column 20, the back of the card is exposed above the top edge of flap 14 as clearly depicted in FIG. 7. At the same time, the upper surface of the card immediately below the card which is slid upwardly is exposed. Therefore, it is clearly evident that with each column 20-28 comprising a different grammatical form, cards in the respective columns can contain a plurality of choices for that particular grammatical form with the appropriate choice in a primary language, in this case English, being exposed by sliding one or more cards upwardly within their respective columns to expose the word or phrase chosen. The lower edge of the card which is slid up acts as an indicator to depict the word chosen, as can be seen, for example, with respect to column 20 and the card 30.

It can be seen with respect to FIG. 2 that by juxtaposing the columns 20-28 in an appropriate manner, complete sentence structure can be produced. For instance, column 20 contains interrogatory expressions, column 21 contains verbs, column 22 contains infinitives, column 23 contains object pronouns and reflexive pronouns, column 24 contains articles, numerals and other adjectives, column 25 contains nouns, column 26 contains destinations, locations and points of origin, column 27 contains expressions denoting to whom, for whom, and with whom and column 28 contains expressions of time arranged in hours, days, months and seasons. Obviously, by raising the appropriate cards in the columns 20-28, a reasonably coherent and grammatically accurate statement or question can be produced in the primary language.

With respect to FIG. 8, it can be seen that cards 32 and 32' which are cards taken from column 25 depict the translation structure of the invention. Card 32 represents the topmost card in column 25 with the front side of the card being shown in FIG. 2, and the rear side of the card being shown in FIG. 8. Card 32' would be that card which is disposed immediately below card 32 with the front side of the card containing the English language nouns as depicted in FIG. 8. It will be noted that the secondary language nouns on the rear side of card 32 represent the translation and phonetic pronunciation guide for the secondary language, in this case Spanish. Obviously, the rear side of card 32' contains the translation of the English words which would be contained on the front side of the next lowest card disposed in column 25 and, of course, the columns of words on respective sides of a particular card will be in an upside down opposed relationship to one another so as to facilitate the described translation accomplished by flipping the flap 14 over, such as most clearly illustrated in FIGS. 6 and 7. Bearing this in mind, we again refer to FIG. 7 wherein a question in English is exposed by moving the appropriate cards within their respective columns to point to the desired question. By flipping the entire flap 14 over, it will be noted that the ends of the cards in columns 20-28 which have been moved to expose the English words contain on their opposite side the translation of the English question with the edge of flap 14 acting as a pointer to the correct secondary language translation including with it a phonetic guide to pronunciation.

The columns 20-28 may be placed in any sequential, semantic and/or syntactic relationship which may exist between or among the forms of the language stored in each column. In this manner, the translator serves as an integrator of syntactical components and it will be noted that, notwithstanding the uneven plane of syntactical components selected from the primary language side of the translator, the integrated sentence on the flip side of flap 14 is invariably displayed in linear fashion thus making it simple and easy to directly read the translation therefrom.

It should be noted that, when the primary and secondary languages bear sufficient structural similarities, the device can be used to translate complete sentences and smaller grammatical units such as words and phrases. In languages with contrasting sentence structures, the translator can be used advantageously at the word and at the phrase level as well. Also, the device can be used for other than direct translation from one language to another. For example, if the primary and secondary languages are the same, the translator acts purely as an integrator of elements of one language so as to render complete sentences which can be used as a means of communication by deaf mutes, etc. The translator has useful functions and applications in other areas such as in the field of education.

The translator is a device of simple construction and operation which capitalizes on the structural similarities of language to provide the means by which an individual may compose phrases and/or sentences in his own language so as to render, simultaneously, equivalent phrase and/or sentence constructions in a second language. The function is effected as discussed above by the spatially-synchronized syntactical components of two languages utilizing for that purpose both sides of the rectangular plastic laminated cards stacked in juxtaposition with the number and sequence of the stacks determined by the nature of the syntax of the languages and other factors. The number of cards in each stack is determined by the nature or class of structures contained therein, the needs of the user of the device, and physical feasibility. It should be noted that physical feasibility does not preclude comprehensive representation of certain classes of language components, such as interrogative forms which require no more than 4 or 5 cards or word bearing elements. Furthermore, the simple construction and operation of the translator eliminates the need for cumbersome mechanical parts or attachments thus making it possible to stack 12 or 13 word bearing cards and their corresponding dividers with their combined bulk occupying a space of no more than ½-inch in thickness.

A color coding technique can also be utlized to match articles, adjectives and nouns in the primary language in those instances in which the grammar of the secondary language makes distinctions of gender and requires that articles, adjectives and nouns be matched accordingly. Such a technique enhances the accuracy of the translation rendered by the device.

A second model of the translator with the roles and alphabetical arrangement of the two languages reversed would allow a native speaker of the secondary language to compose phrases and/or sentences in his language so as to render, simultaneously, equivalent phrases and/or sentence constructions in the primary language. Thus, by using two models of the translator in the manner described, conversation can be carried on between persons having different native tongues without either of them knowing the other's language.

Also, the translator 10 includes aids to translation including sections in a note pad 34 which are appropriately labelled and contain preprinted useful information regarding use of the translator and translations of often used expressions as well as space for the user to make notes. Pad 34 is approximately the same size as the complete section containing columns 20–28 and thus is conveniently stored in casing 12 when the casing is closed. Spacers 36 are attached on each side of the casing to insure adequate interior space for receiving the columns 20–28 and pad 34.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A device for organizing and translating between first and second languages, said device comprising:
   a casing;
   a plurality of columns disposed within said casing;
   at least first and second overlying cards having first and second sides being disposed in each of said columns with said cards being slidably movable relative to each other; and
   said first and second languages being disposed on said cards with said first language being disposed on said first sides of said cards and said second language being being disposed on said second sides of said cards, said second side of said second card containing a translation into said second language of said first language contained on said first side of said first card with such a translating arrangement being followed with respect to all of said cards in said columns.

2. The invention as defined in claim 1 wherein each of said columns contains cards having a similar syntactic form.

3. The invention as defined in claim 2 wherein the cards of differing columns contain different syntactical forms.

4. The invention as defined in claim 1 wherein the columns are mounted on a panel of the casing with each card being capable of sliding within the column to expose portions of the card beneath it with the rear of the card being slid being exposed above one edge of said panel.

5. A device for organizing and translating between first and second languages, comprising:
   a casing;
   a first column disposed within said casing; and
   a plurality of overlying cards slidably retained in said first column, said cards having first and second sides, portions of said first language being written on said first sides of said cards and translations of said portions of said first language being written on said second sides of said cards, said translations being contained on separate cards from those having said portions of said first langauge being translated, so as to permit an accummulation of said overlying cards as desired without affecting said translating ability of said device, inasmuch as directly abutting cards will respectively contain said portions of said first language and said translations into said second language of said portions of said first language.

6. The device for organizing and translating between first and secont languages as defined in claim 5, and further wherein at least one additional column containing overlying cards is provided in said casing.

7. The device for organizing and translating between first and second languages as defined in claim 6, and further wherein said first column and said additional column contain cards having a similar syntactic form.

8. The device for organizing and translating between first and second languages as defined in claim 7, and further wherein said first column and said additional column contain different syntactical forms of said first and second languages.

* * * * *